US012463000B2

(12) United States Patent
Daugherty

(10) Patent No.: US 12,463,000 B2
(45) Date of Patent: *Nov. 4, 2025

(54) MAGNETO-ELECTROSTATIC SENSING, FOCUSING, AND STEERING OF ELECTRON BEAMS IN VACUUM ELECTRON DEVICES

(71) Applicant: ELVE INC., Davis, CA (US)

(72) Inventor: Diana Gamzina Daugherty, Davis, CA (US)

(73) Assignee: ELVE INC., Davis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,895

(22) Filed: Feb. 27, 2024

(65) Prior Publication Data
US 2024/0258061 A1  Aug. 1, 2024

Related U.S. Application Data

(63) Continuation of application No. 17/525,698, filed on Nov. 12, 2021, now Pat. No. 11,961,693.
(Continued)

(51) Int. Cl.
*H01J 23/083* (2006.01)
*H01J 9/18* (2006.01)
(Continued)

(52) U.S. Cl.
CPC .............. *H01J 23/083* (2013.01); *H01J 9/18* (2013.01); *H01J 23/06* (2013.01); *H01J 23/165* (2013.01);
(Continued)

(58) Field of Classification Search
CPC .. H01J 23/083; H01J 9/18; H01J 23/06; H01J 23/165; H01J 29/62; H01J 29/70;
(Continued)

(56) References Cited

U.S. PATENT DOCUMENTS

| | | | |
|---|---|---|---|
| 2,841,739 | A | 7/1958 | Pierce |
| 2,845,571 | A | 7/1958 | Kazan |

(Continued)

FOREIGN PATENT DOCUMENTS

| | | |
|---|---|---|
| CN | 106469596 A | 3/2017 |
| CN | 108682605 A | 10/2018 |

(Continued)

OTHER PUBLICATIONS

Baig, A., et al., "Performance of a Nano-CNC Machined 220-GHz TWT Amplifier", IEEE Trans. on Electron Devices, vol. 64, No. 5, pp. 2390-2397, May 1, 2017.
(Continued)

*Primary Examiner* — Abdullah A Riyami
*Assistant Examiner* — Syed M Kaiser
(74) *Attorney, Agent, or Firm* — Sheppard Mullin Richter & Hampton LLP

(57) ABSTRACT

Vacuum electron devices (VEDs) are produced having a plurality of two-dimensional layers of various materials that are bonded together to form one or more VEDs simultaneously. The two-dimensional material layers are machined to include features needed for device operation so that when assembled and bonded into a three-dimensional structure, three-dimensional features are formed. The two-dimensional layers are bonded together using brazing, diffusion bonding, assisted diffusion bonding, solid state bonding, cold welding, ultrasonic welding, and the like. The manufacturing process enables incorporation of metallic, magnetic, and ceramic materials required for VED fabrication while maintaining required positional accuracy and multiple devices per batch capability. The VEDs so produced include a combination of magnetic and electrostatic lenses for electron beam control.

14 Claims, 13 Drawing Sheets

Related U.S. Application Data

(60) Provisional application No. 63/198,915, filed on Nov. 21, 2020, provisional application No. 63/198,817, filed on Nov. 15, 2020.

(51) Int. Cl.
 H01J 23/06 (2006.01)
 H01J 23/16 (2006.01)
 H01J 25/34 (2006.01)
 H01J 29/62 (2006.01)
 H01J 29/70 (2006.01)

(52) U.S. Cl.
 CPC .............. *H01J 29/62* (2013.01); *H01J 29/70* (2013.01); *H01J 25/34* (2013.01); *H01J 2229/581* (2013.01); *H01J 2229/582* (2013.01)

(58) Field of Classification Search
 CPC ................. H01J 25/34; H01J 2229/581; H01J 2229/582; H01J 23/087; H01J 23/09; H01J 23/10
 See application file for complete search history.

(56) References Cited

U.S. PATENT DOCUMENTS

| | | | |
|---|---|---|---|
| 4,001,630 A | 1/1977 | Gross | |
| 5,744,910 A | 4/1998 | Symons | |
| 5,848,925 A * | 12/1998 | Howard | H01J 9/025 445/24 |
| 5,986,388 A | 11/1999 | Makishima | |
| 6,236,164 B1 | 5/2001 | Beeteson et al. | |
| 6,538,367 B1 | 3/2003 | Choi et al. | |
| 6,593,695 B2 * | 7/2003 | Theiss | H01J 23/22 315/5.35 |
| 6,664,734 B1 | 12/2003 | Jasper, Jr. | |
| 7,279,686 B2 | 10/2007 | Schneiker | |
| 8,547,006 B1 | 10/2013 | Ives et al. | |
| 8,723,137 B1 | 5/2014 | Hwu et al. | |
| 8,766,541 B1 | 7/2014 | Hoff et al. | |
| 9,105,440 B2 | 8/2015 | Chen et al. | |
| 9,819,320 B1 | 11/2017 | Hoff et al. | |
| 10,005,217 B2 | 6/2018 | Willams et al. | |
| 10,714,292 B2 | 7/2020 | Luhmann, Jr. et al. | |
| 2002/0145376 A1 | 10/2002 | Kakesu et al. | |
| 2002/0167276 A1 | 11/2002 | Vancil | |
| 2003/0030390 A1 * | 2/2003 | Theiss | H01J 25/42 315/501 |
| 2005/0023984 A1 | 2/2005 | Vancil et al. | |
| 2006/0091830 A1 * | 5/2006 | Theiss | H01J 23/24 315/500 |
| 2008/0024236 A1 | 1/2008 | Dayton | |
| 2008/0272698 A1 | 11/2008 | Dayton et al. | |
| 2010/0327743 A1 | 12/2010 | Durand et al. | |
| 2011/0006678 A1 | 1/2011 | Ferguson | |
| 2011/0064414 A1 | 3/2011 | Kowalczyk et al. | |
| 2012/0176133 A1 * | 7/2012 | Sirigiri | G01R 33/3607 324/318 |
| 2013/0037716 A1 * | 2/2013 | Tadaka | H01J 37/28 250/307 |
| 2013/0153782 A1 | 6/2013 | Ren et al. | |
| 2013/0168465 A1 * | 7/2013 | Okamura | B05B 17/0653 310/346 |
| 2014/0353576 A1 | 12/2014 | Patti | |
| 2016/0099127 A1 | 4/2016 | Aditya et al. | |
| 2016/0260595 A1 | 9/2016 | Barofsky et al. | |
| 2019/0057830 A1 | 2/2019 | Ferrari | |
| 2019/0074154 A1 | 3/2019 | Woodman et al. | |
| 2021/0280384 A1 | 9/2021 | Bhosale | |
| 2022/0157550 A1 | 5/2022 | Daughterty | |

FOREIGN PATENT DOCUMENTS

| | | |
|---|---|---|
| CN | 109273337 A | 1/2019 |
| EP | 2546385 A1 | 3/2011 |
| FR | 2925217 A1 | 6/2009 |
| JP | S61163536 A | 7/1986 |
| JP | 7-99026 A | 4/1995 |
| JP | H0831304 A | 2/1996 |
| JP | 8-255558 A | 10/1996 |
| JP | H08339773 A | 12/1996 |
| JP | 10-74445 A | 3/1998 |
| JP | 2001057146 A | 2/2001 |
| JP | 2005-507579 A | 3/2005 |
| JP | 2007502522 A | 2/2007 |
| JP | 2008519423 A | 6/2008 |
| JP | 2011523181 A | 8/2011 |
| JP | 2014107143 A | 6/2014 |
| JP | 6-139944 B2 | 5/2017 |
| TW | 201511065 A | 3/2015 |
| WO | 2005017938 A2 | 2/2005 |
| WO | 2006052549 A2 | 5/2006 |
| WO | 2008133515 A2 | 11/2008 |
| WO | 2009149291 A2 | 12/2009 |
| WO | 2019177835 A1 | 9/2019 |

OTHER PUBLICATIONS

Gamzina, D., et al., "Mechanical Design and Manufacturing of W-Band Sheet Beam Klystron", IEEE Trans. on Electron Devices, vol. 64, No. 6, pp. 2675-2682, Jun. 1, 2017.
Johnson, H.S., et al., "A 10-watt electro-statically focused TWT for satellite telemetry", 1960 IEDM, IEEE, Oct. 27, 1960.
Wikipedia, "Halbach Array", Sep. 9, 2021.
Vancil, K.B., et al., "A Low Cost TWT for Wireless Communications", IEEE, 2002 IEEE MT T-S Int'l Microwave Symposium Digest, Jun. 2, 2002.
Scott, Allan W., "Why a Circuit Sever Affects TWT Efficiency", IEEE Trans. on Electron Devices, pp. 35-40, Jan. 1, 1962.
Radartutorial.Eu, "Travelling Wave Tube", Feb. 10, 2021.
ISR in Related Case PCT-US2021-0529277 (ELVE-0001WO) Dated Mar. 21, 2022.
ISR in Related Case PCT-US2021-0529279 (ELVE-0002WO) Dated May 11, 2022.
Taiwan IPO Search Report in Related Application (#110142439).

\* cited by examiner

MAGNETO-ELECTROSTATIC SENSING, FOCUSING, AND STEERING OF ELECTRON BEAMS IN VACUUM ELECTRON DEVICES

PRIORITY CLAIM

The present application is a continuation application of U.S. patent application Ser. No. 17/525,698, filed Nov. 12, 2021, and entitled "Magneto-Electrostatic Sensing, Focusing, And Steering Of Electron Beams In Vacuum Electron Devices", which claims the benefit of U.S. Provisional Patent Application Ser. No. 63/198,817, filed on Nov. 15, 2020, entitled "Multi-Layered Multi-Material Manufacturing Process For Vacuum Electronic Devices", and U.S. Provisional Patent Application Ser. No. 63/198,915, filed on Nov. 21, 2020, and entitled "Electronic Magneto-Electrostatic Sensing, Focusing, And Steering of Electron Beams In Microwave, Millimeter Wave, And Near-Terahertz Vacuum Electronic Devices", the contents of which are hereby incorporated by reference as if set forth fully herein.

The present application may be considered related to U.S. patent application Ser. No. 17/525,658, filed on Nov. 12, 2021, and entitled "Multi-Layer Vacuum Electron Device and Method of Manufacture", now U.S. Pat. No. 11,894,208, which claims the benefit of U.S. Provisional Patent Application Ser. No. 63/198,817, filed on Nov. 15, 2020, entitled "Multi-Layered Multi-Material Manufacturing Process For Vacuum Electronic Devices" and U.S. Provisional Patent Application Ser. No. 63/198,915, filed on Nov. 21, 2020, entitled "Electronic Magneto-Electrostatic Sensing, Focusing, And Steering Of Electron Beams In Microwave, Millimeter Wave, And Near-Terahertz Vacuum Electronic Devices". U.S. patent application Ser. No. 17/525,658 is hereby incorporated by reference herein.

TECHNICAL FIELD

The present disclosure relates generally to a manufacturing process used for the fabrication of vacuum electron devices (VEDs) having a plurality of two-dimensional layers of various materials that are bonded together to form one or more VEDs simultaneously. The two-dimensional material layers are machined to include features needed for device operation so that when assembled and bonded into a three-dimensional structure, three-dimensional features are formed. The two-dimensional layers are bonded together using brazing, diffusion bonding, assisted diffusion bonding, solid state bonding, cold welding, ultrasonic welding, and the like. The manufacturing process enables incorporation of metallic, magnetic, and ceramic materials required for VED fabrication while maintaining required positional accuracy and multiple devices per batch capability. The VEDs so produced include a combination of magnetic and electrostatic lenses for electron beam control.

BACKGROUND

Vacuum electron devices (VEDs) operate in a vacuum environment and take advantage of the interaction between one or more electron beam(s) and an electromagnetic field generated in an interaction region of the VED. The construction of a VED requires incorporation of metallic, ceramic, magnetic and other materials into a single assembly which may be held at or enclosed in a vacuum so as not to impede the transit of electrons from a cathode (electron emitter) to a collector (electron receptor) of the vacuum electron device. The vacuum region is also referred to as a vacuum chamber or cavity or tunnel or RF interaction region and is where the interaction between the electron beam(s) and the electromagnetic wave(s) takes place. Examples of such VEDs in the prior art include (but are not limited to) particle accelerators, klystrons, gyrotrons, gyro-klystrons, gyro-amplifiers, travelling wave tubes (TWTs), gyro-TWTs, backward wave oscillators, inductive output tubes (IOTs), magnetrons, cross-field amplifiers, free electron lasers, ubitrons, masers, diodes, triodes, tetrodes, pentodes, and the like. Some gas ion lasers, while not strictly operating at a vacuum but at a very low pressure, and generally lacking an RF interaction region, operate in much the same manner.

Electron beam propagation through the electron beam tunnel of a VED is conventionally achieved by using either magnetic fields or electrostatic fields to contain the electron beam within the electron beam tunnel. Space charge, the effect of the negatively-charged electrons being compressed in a narrow beam, tends to spread the beam out as the electrons tend to repel one-another due to the similar charge that they all have. Confinement techniques are therefore necessary in order to keep the beam together for a longer period of time and distance so that its interaction with the RF signal in the interaction region may be prolonged for greater efficiency and performance of the VED.

Permanent magnets, electro magnets, as well as periodic arrays of permanent magnets or electro-magnets are commonly employed to confine the beam to the beam tunnel. Two challenges arise when assembling the VED and preparing it for operation: (1) beam tunnel, magnetic center line, and the injection location of the beam are often not perfectly aligned due to manufacturing and assembly variances, which are especially pronounced in higher frequency devices; (2) magnetic material quality is not adequate for ensuring that the magnet domains of individual magnets co-align with design goals with the required accuracy, thus resulting in magnetic field non-uniformities. As a result, after the VED is manufactured, a technical expert usually spends considerable effort in adjusting or trimming the magnetic field around the VED in order to achieve optimal electron beam transmission. This trimming is generally performed by applying trim magnets manually to the outside of the VED structure using an adhesive. This process has limited outputs for guidance on the transmission optimization process, most often just the beam transmission comparison to the cathode current, whereas there are multiple locations where the additional trim magnets can be added to optimize VED performance. The process is lengthy and can take anywhere from a few hours to a few weeks to complete depending upon the complexity of the VED. Periodic cusped magnet assemblies for sheet electron beam VEDs have recently been incorporating quadrupole alignment magnets for this purpose, but they only provide incremental acceleration of the alignment process and are still inadequate for the needs of near-THz devices.

Prior VEDs were generally manufactured using individual two- and three-dimensional subcomponents, forming the subcomponents into an assembly, bonding the assembly to an envelope to provide a structural support and a vacuum envelope, and then carrying out conventional vacuum processing and sealing procedures to yield a functioning VED. Such procedures could take, depending upon the complexity of the device, weeks or more to complete a single device and utilized a great deal of highly skilled hands-on labor and large clean rooms in which to carry out the procedures. Today, as wireless high bandwidth data communications demand is exploding from earth stations to satellites to cell towers and local WIFI systems and ground backbone systems, a substantial need exists for large quantities of such devices at lower cost.

Overview

The subject matter described herein generally relates to the manufacturing of vacuum electron devices (VEDs) utilizing parallel sheets of materials which are assembled in a stack and bonded together to form a three-dimensional VED. An advantage of this approach is that a plurality of VEDs may be manufactured simultaneously in the same structure and simply cut apart when complete for individual use much like is commonly done in semiconductor device fabrication, thus reducing the per-device manufacturing cost significantly. The VEDs so produced include a combination of magnetic and electrostatic lenses for electron beam control.

The foregoing overview is a summary and thus may contain simplifications, generalizations, and omissions of detail; consequently, those skilled in the art will appreciate that the overview is illustrative only and is not intended to be in any way limiting.

BRIEF DESCRIPTION OF THE DRAWINGS

The accompanying drawings, which are incorporated into and constitute a part of this specification, illustrate one or more exemplary embodiments and, together with the description of the exemplary embodiments, serve to explain the principles and implementations of the invention.

In the drawings.

DESCRIPTION OF EXAMPLE EMBODIMENTS

Figure 1:
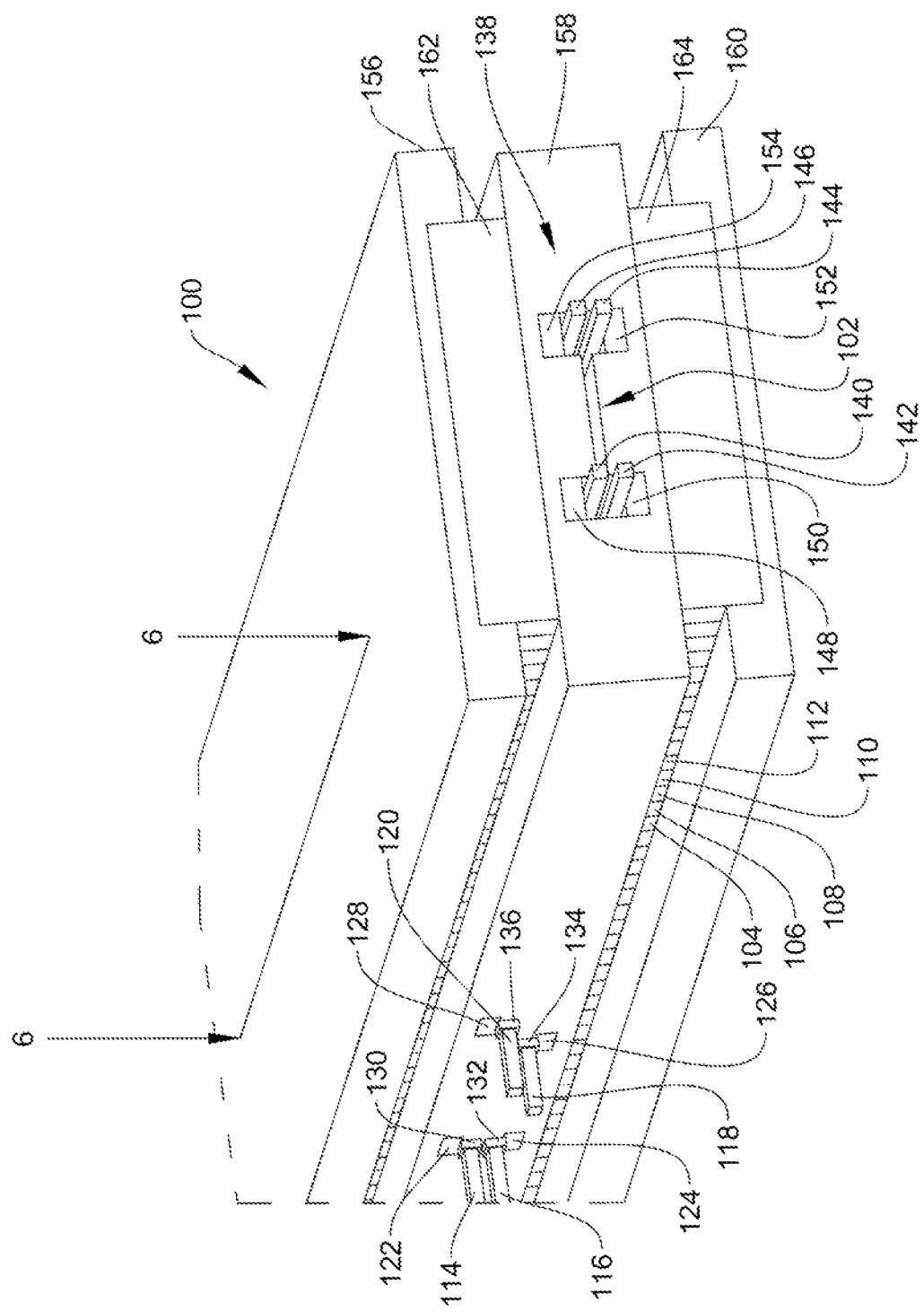
FIG. 1 is a front right side perspective view of a VED in accordance with an embodiment.

Exemplary embodiments are described herein in the context of a VED such as a TWT. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the exemplary embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

References herein to "one embodiment" or "an embodiment" or "one implementation" or "an implementation" and the like means that a particular feature, structure, part, function or characteristic described in connection with an exemplary embodiment can be included in at least one exemplary embodiment. The appearances of phrases such as "in one embodiment" or "in one implementation" and the like in different places within this specification are not necessarily all referring to the same embodiment or implementation, nor are separate and alternative embodiments necessarily mutually exclusive of other embodiments.

In accordance with this disclosure, the components and process steps described herein may be implemented using various techniques without departing from the scope and spirit of the inventive concepts disclosed herein.

What is described here includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments, examples and implementations are described herein for illustrative purposes, various modifications are possible that are considered within the scope of such embodiments and examples, as those skilled in the relevant art can recognize.

In particular and in regard to the various functions performed by the above described components, devices, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

In addition, while a particular feature of the subject invention may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In the figures, where a callout number or reference symbol is used in more than one figure, it is intended to refer to the same or a similar part, component or step, unless clearly not so intended from the contents of the disclosure.

The devices and methods described herein can be employed for VEDs utilizing pencil beams, sheet beams, rectangular beams, elliptical beams, hollow beams, distributed beams and multiple beams.

While most of the description below is addressed to building a VED in layers from below the electron beam to above the electron beam with plates arrayed parallel to the electron beam, it is also contemplated that such a device may be constructed orthogonal to the electron beam in a relatively straightforward manner given the teachings herein. Such a device may also be constructed at an arbitrary angle to the electron beam if desired, as, for example, in a distributed beam device.

A key benefit of the present invention is its ability to permit the simultaneous fabrication of a plurality of VEDs in one batch and then cut them into individual components, although using this invention to make even single prototype devices has proven to be much more cost effective than prior technologies.

Typically, magnets are used to provide at least some of the electron beam forming and aiming functions in a VED. If the electron beam is not properly directed from the cathode to the anode it may impinge upon some other part of the VED structure, causing damage and contaminating the vacuum area. The ability to incorporate a variety of magnet material types is beneficial to the assembly of VEDs. Halbach, or quadrupole arrays are often employed for focusing the electron beam as are solenoids deployed about the electron beam at some distance from it. Another key benefit of the present invention is its ability to provide a higher strength magnetic field at the electron beam for a given magnet (electromagnetic solenoid or fixed) because the invention allows the magnets to be brought much closer to the electron beam without placing them within the vacuum chamber. Since the magnetic field from a magnet decreases with the square of the distance from the magnet the magnets may be brought closer and made smaller by means of the present invention. The magnetic steering can be performed by means of actual magnets as well as a combination of magnets and magnetically susceptible materials which, in conjunction with the magnets, establish desired magnetic fields within the VED to properly steer the electron beam. Since magnetic materials and/or iron- and nickel-containing materials are not good electrical conductors, the electromagnetic circuit is typically made of materials like copper (or tungsten for helix-type devices) moving the focusing structure further from the electron beam. The magnets and/or iron- and nickel-containing materials can be electroplated with high electrical conductivity materials such as copper and employed to alleviate this problem, however such an arrangement can create potential vacuum purity issues for the VED as such materials can degrade over time in a VED.

Electrostatic focusing may also be used to provide some of the electron beam forming and aiming functions in a VED. The ability of the present invention to introduce electrical conductors into the vacuum structure now permits the use of precise electrostatic focusing within the vacuum structure by applying a voltage across two or more plates disposed about the electron beam. A number of sets of such plates may be employed if desired or required by the specific application.

The manufacturing approach described herein can be employed for manufacturing VEDs at a variety of frequencies, but it is especially beneficial for VEDs operating between about 25 GHz and about 1 THz. The manufacture of such devices using conventional manual device assembly is challenging due to the small feature scale (micrometers to millimeters in some cases).

The embodiments herein described generally relate to improved electron beam current sensing, electron beam focusing, and electron beam steering within VEDs. Specifically, the embodiments illustrate novel mechanisms for electronic sensing and control of electron beam propagation within a confining magnetic field by utilizing electrical conductors (electrodes) for imposing electrostatic fields onto the electron beam at close range from nearby the electron beam. The electrodes may be employed for detailed sensing of beam transmission and losses along the VED circuit structure as well as for applying electrical potential in the region around the electron beam to either focus the beam (by using electrostatic lenses—generally single potential elements) or steer the beam (by using electrostatic deflectors—generally two or four potential elements). An electronic control system of conventional design is then able to be employed to sense the currents from the sensors and thereby adjust the potentials on the various electrodes to maximize current flow through the electron beam and minimize current flow into the body of the VED in a relatively straightforward manner consuming much less time than prior approaches.

Turning now to the figures, FIG. 1 is a front right side perspective view of a VED 100 in accordance with an embodiment. The VED 100 of FIG. 1 may be, for example, a sheet beam TWT. The VED 100 of FIG. 1 may be fabricated, in accordance with an embodiment, in a number of stacked and bonded-together layers. The layers may be arranged in parallel so that they are parallel to the electron (sheet) beam axis (one end of which axis is denoted 102), or they may be arranged orthogonal to that axis, or at some other angle, if desired. In accordance with FIG. 1 the interior comprises a repeating pattern of elements 104, 106, 108, 110 and 112 wherein an element 108 is a permanent magnet sandwiched on either side by elements 106 and 110 which may also be permanent magnets or may be formed of a magnetic material such as iron or nickel. Completing the sandwich are elements 104 and 112 which are electrical insulators (e.g., alumina). Electrical signals such as control plate biasing signals (discussed in more detail below) and/or RF input and output signals are carried on terminals 114, 116, 118 and 120. Those terminals are insulated from the rest of the structure by insulators 122, 124, 126 and 128 respectively and conductor insulators 130, 132, 134 and 136, respectively, as shown. A 4-pole (quadrupole) electrostatic steering/focusing assembly 138 is shown at the right end of the VED 100. Assembly 138 includes four electrode terminals 140, 142, 144 and 146 and these are insulated from the structure of VED 100 by insulator pieces 149, 150, 152 and 154, respectively. Elements 156, 158 and 160 which form the outer body of VED 100 are formed of an electrical conductor such as copper. This electrostatic quadrupole focusing approach is particularly useful for sheet beam and pencil beam VEDs. Elements 162, 164 are magnets which help to confine and focus the electron beam which travels along axis 102. Between elements 156 and 160 is located the VED's magnetic assembly or magnetic circuit which may be of one or more of the following types: periodic cusped, periodic permanent, wiggler, Halbach, solenoid, permanent, electro-magnet, electro-permanent magnet, and the like.

Figure 2:
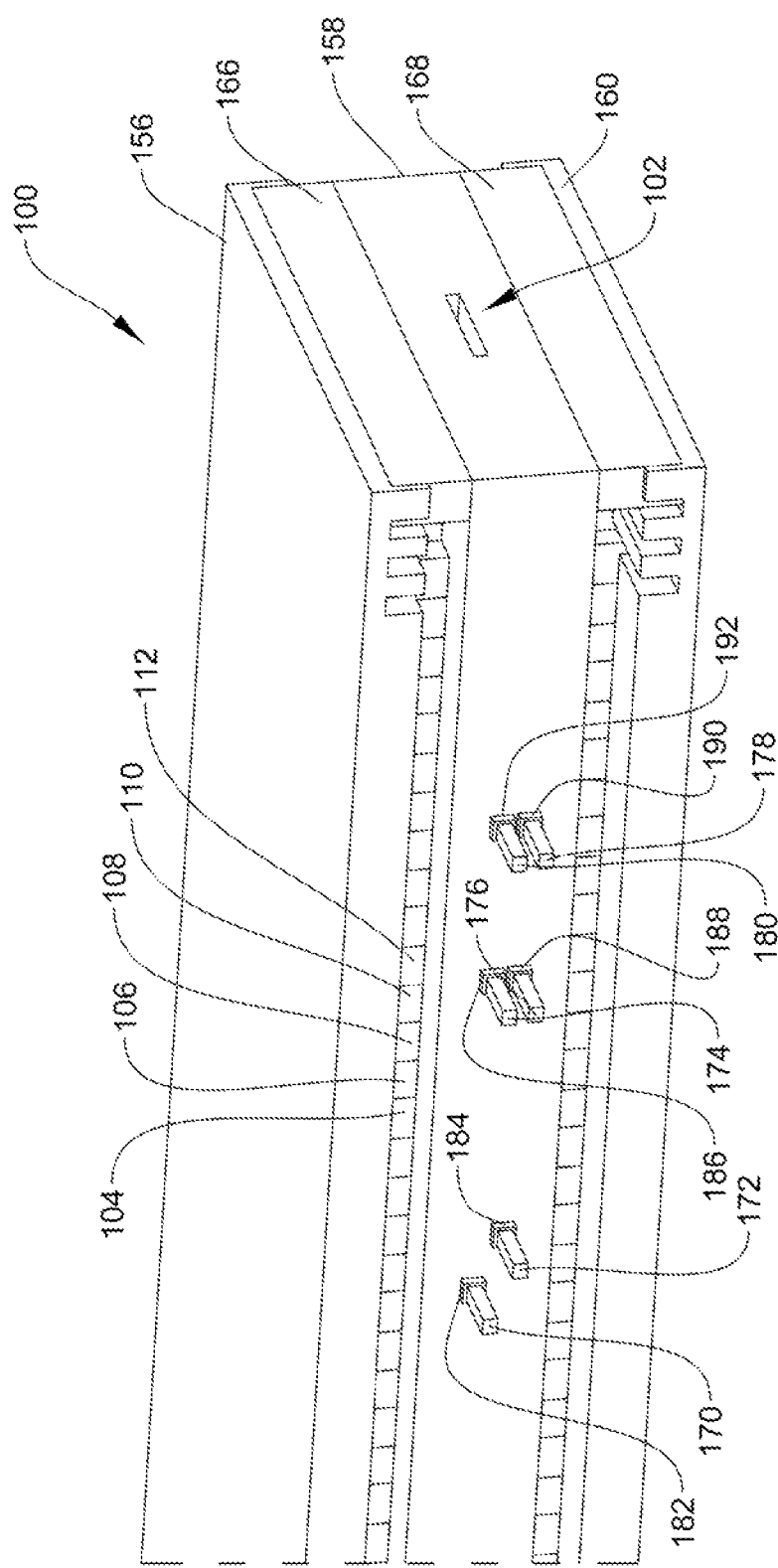
FIG. 2 is a rear left side perspective view of the VED of FIG. 1 in accordance with an embodiment.

FIG. 2 is a rear left side perspective view of the VED 100 of FIG. 1 in accordance with an embodiment. Elements 166, 168 are magnets which help to confine and focus the electron beam which travels along axis 102. Electrical signals such as control plate biasing signals (discussed in more detail below) and/or RF input and output signals are carried on terminals 170, 172, 174, 176, 178 and 180. Those terminals are insulated from the rest of the structure by conductor insulators 182, 184, 186, 188, 190 and 192, respectively, as shown.

Figure 3:
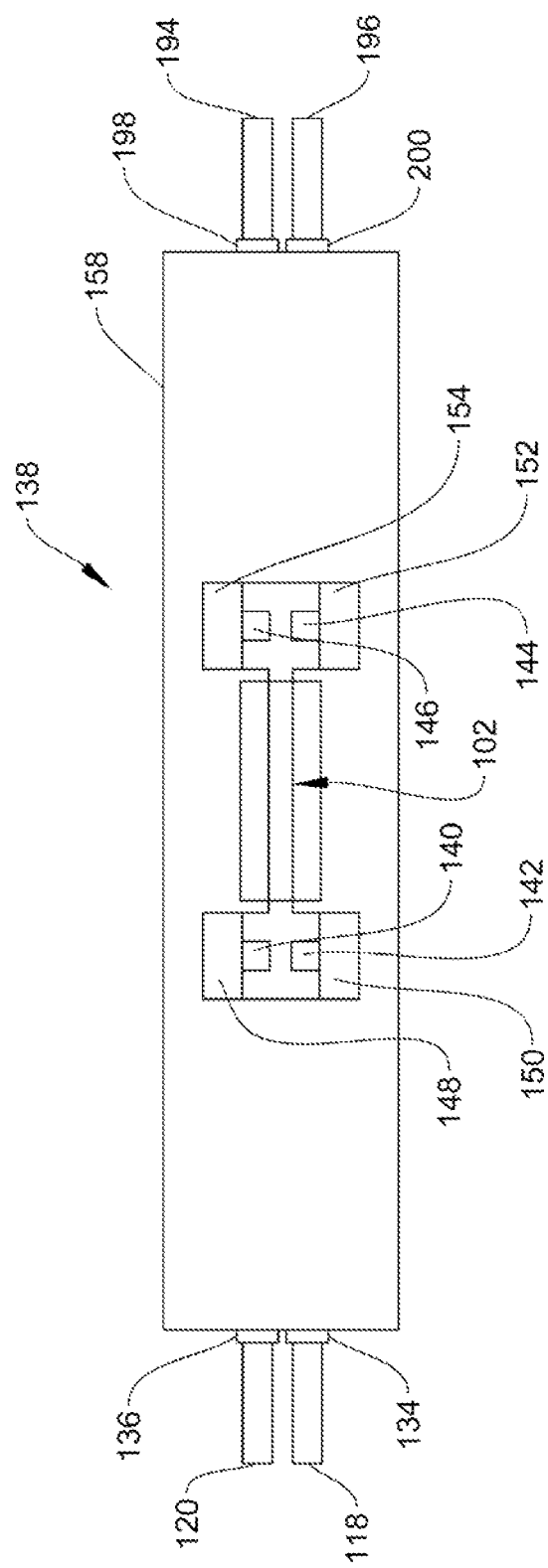
FIG. 3 is a is a right side elevation of the VED of FIG. 1 in accordance with an embodiment.

FIG. 3 is a right side elevation of the VED 100 of FIG. 1 in accordance with an embodiment. It shows a detail of the assembly 138. Additionally shown here are electrical terminals 194, 196 which are insulated from element 158 by conductor insulators 198, 200.

Figure 4:
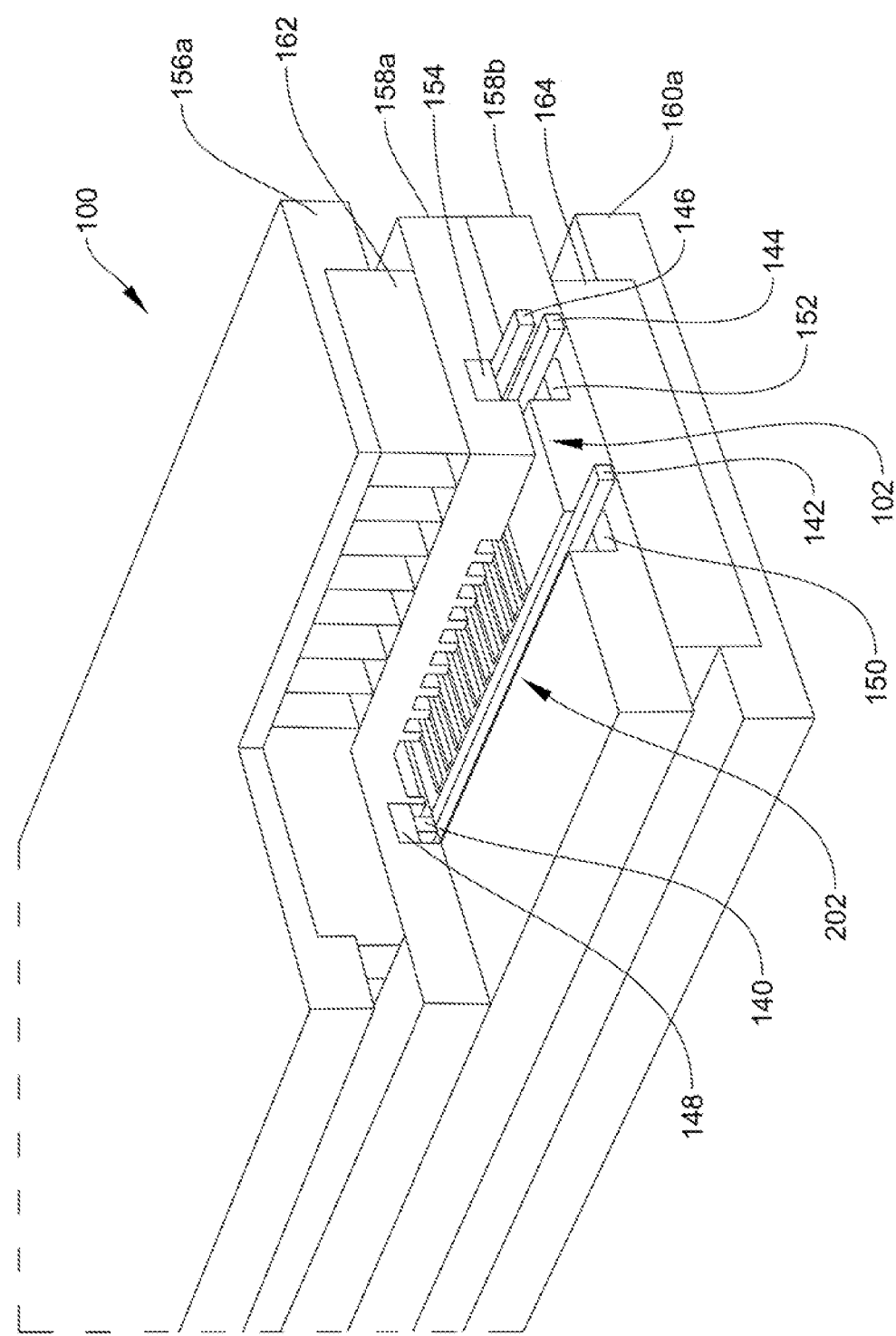
FIG. 4 is a front right side partial cutaway perspective view of the VED of FIG. 1 in accordance with an embodiment.

FIG. 4 is a front right side partial cutaway perspective view of the VED 100 of FIG. 1 in accordance with an embodiment. In accordance with this embodiment, elements 156a and 160a are formed of an insulating material rather than an electrically conductive material like those shown as elements 156 and 160 in FIGS. 1, 2 and 3. Element 158 is shown as having two parts, 158a and 158b in FIG. 4 (and FIG. 5). In the cutaway, the electron sheet beam tunnel 202 may be seen to be a coupled cavity type structure.

Figure 5:
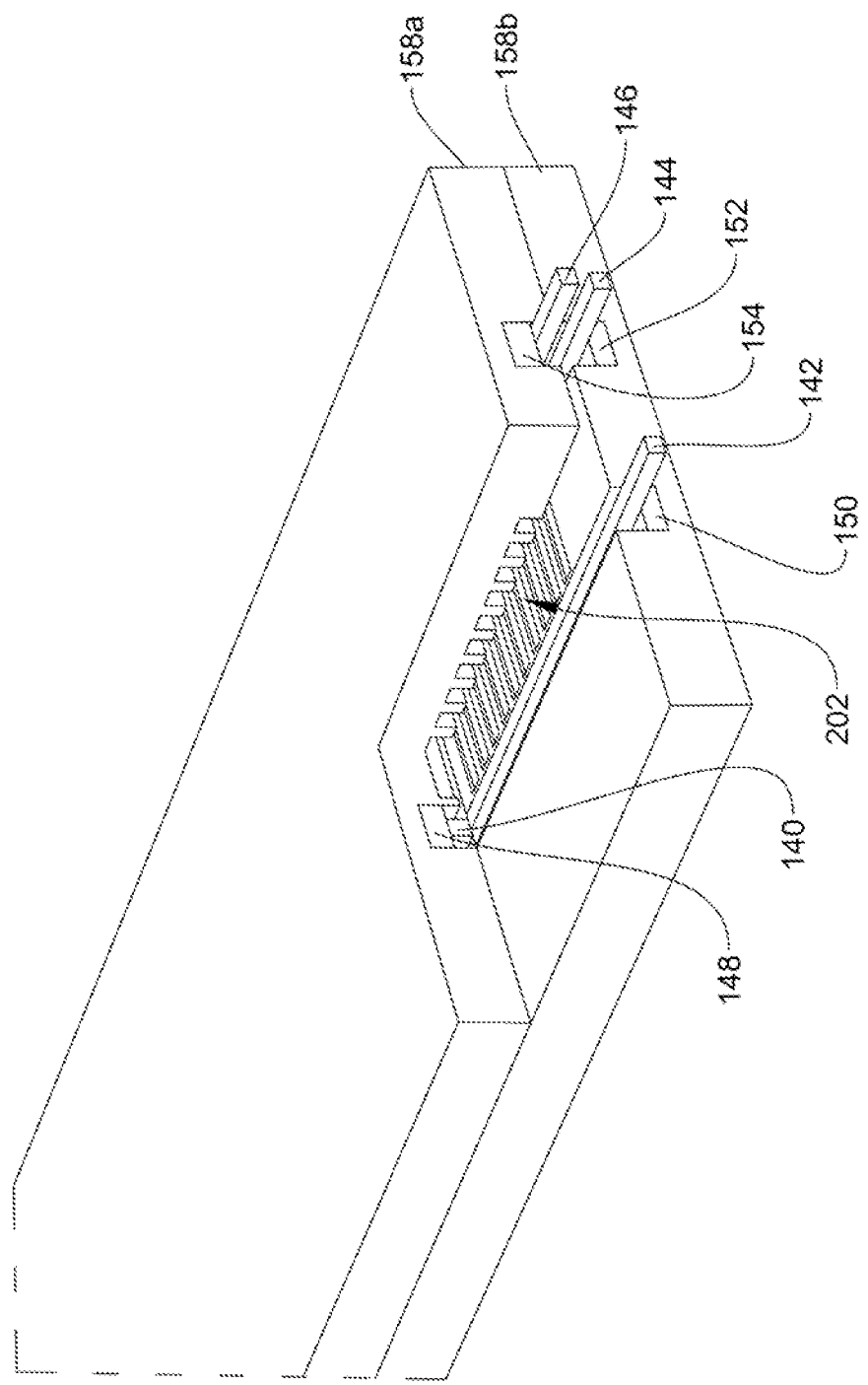
FIG. 5 is an internal front right side partial cutaway perspective view of the VED of FIG. 1 in accordance with an embodiment.

FIG. 5 is an internal front right side partial cutaway perspective view of the VED 100 of FIG. 1 in accordance with an embodiment.

Figure 6:
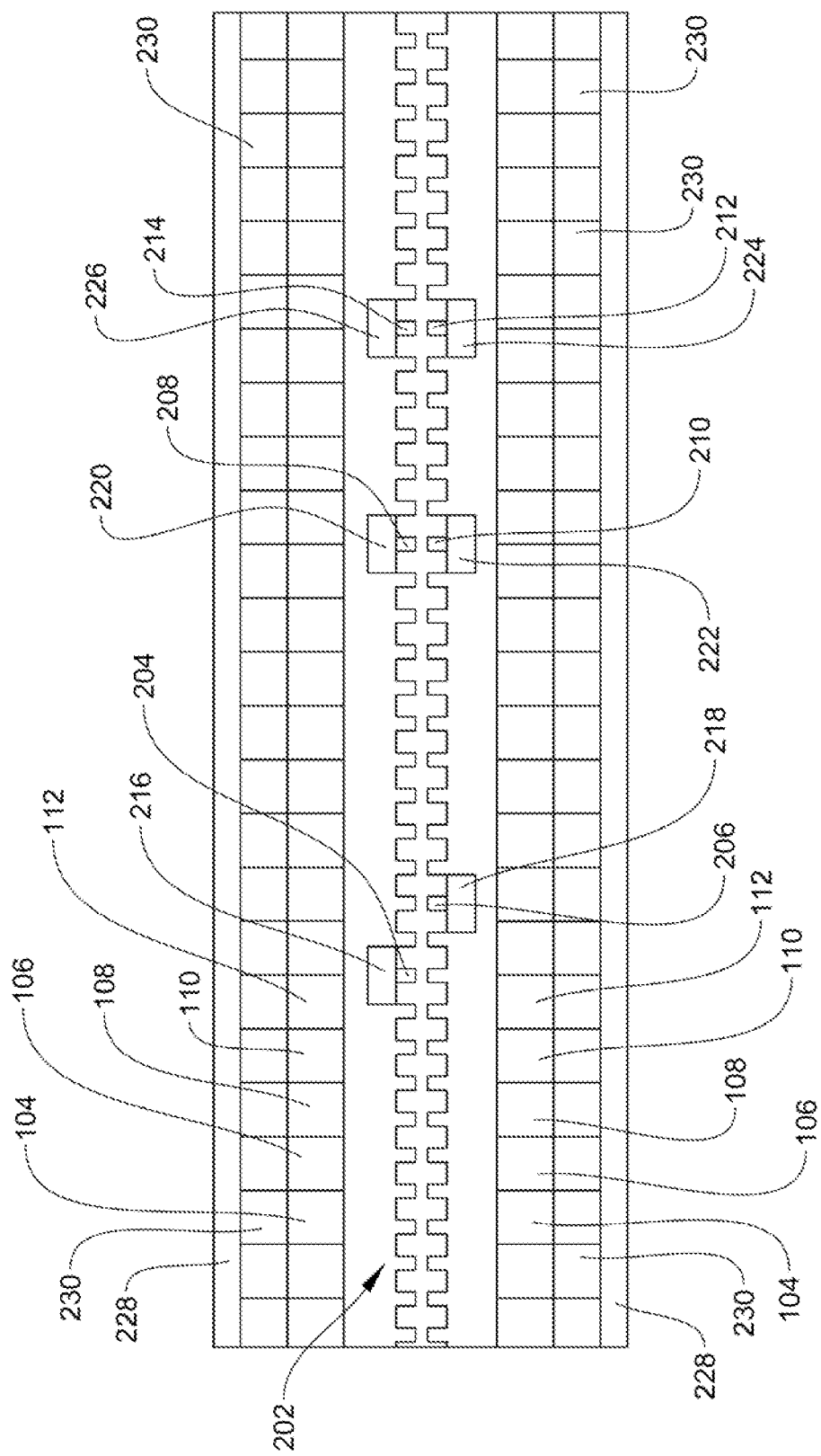
FIG. 6 is a cross-sectional view taken along line 6-6 of a portion of the interior of the VED of FIG. 1 in accordance with an embodiment.

FIG. 6 is a cross-sectional view taken along line 6-6 of a portion of the interior of the VED 100 of FIG. 1 in accordance with an embodiment. Electrical signals such as control plate biasing signals (discussed in more detail below) and/or RF input and output signals are carried on terminals 204, 206, 208, 210, 212 and 214. Those terminals are insulated from the rest of the structure by insulators 216, 218, 220, 222, 224 and 226, respectively, as shown. Element 228 is an outer electrically conductive cover and elements 230 are electrically conductive parts formed of, for example, copper.

Figure 7:
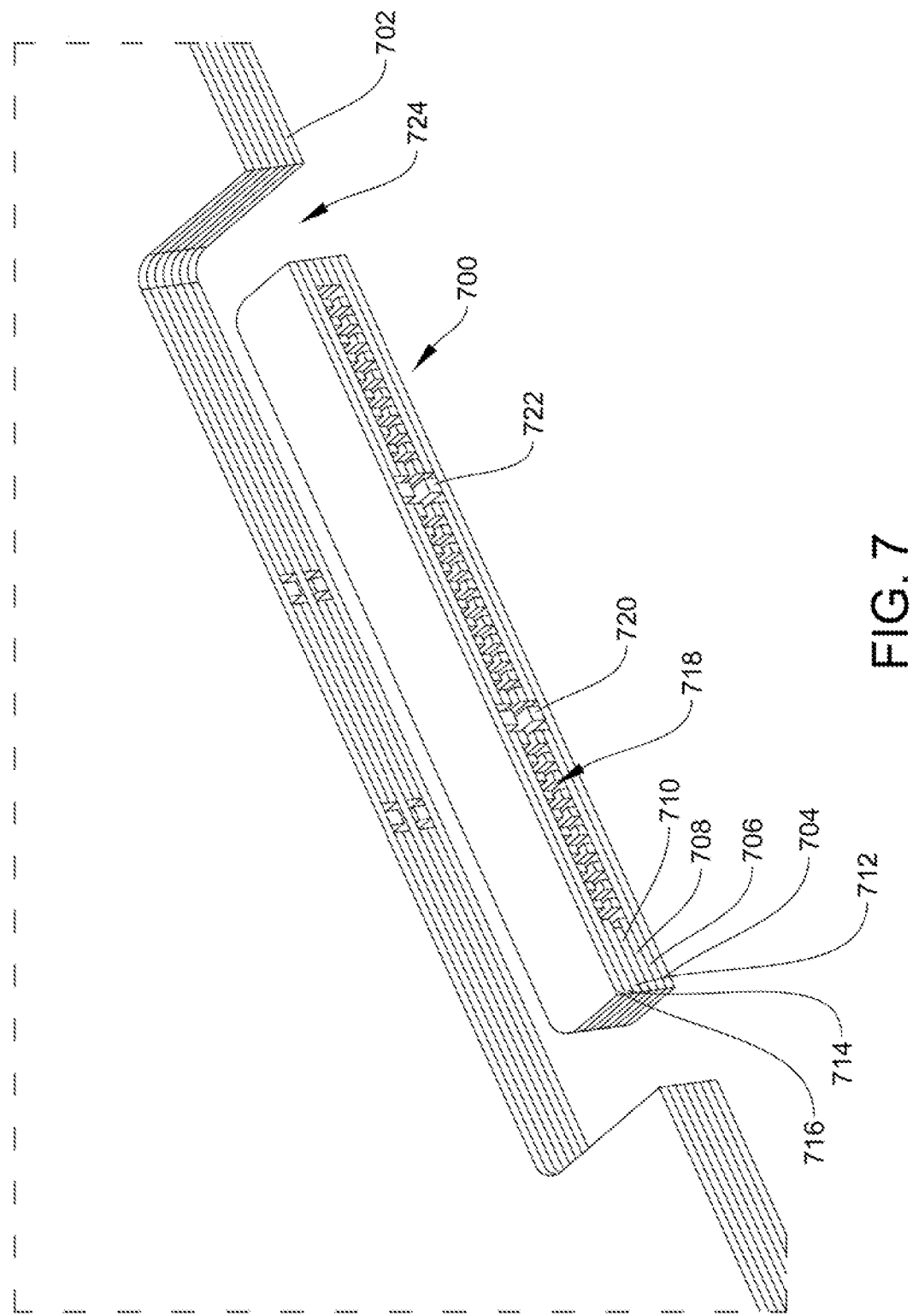
FIG. 7 is a front right side perspective of one VED cut from an assembly in accordance with an embodiment.

FIG. 7 is a front right side perspective of one VED 700 cut from an assembly 702 in accordance with an embodiment. In accordance with this embodiment the VED 700 comprises a plurality of parallel sheets of material 704, 706, 708, 710, 714, 716 of which at least 706, 708, 710, 712 and 714 comprise an electrically conductive material such as copper and 704 and 716 may be a magnetic material such as iron or nickel. The layers 702, 704, 706, 708, 710, 712, 714, 716 are bonded together. An interaction region 718 comprises layers 708, 710, 712 and is where the electron beam of the VED 700 interacts with an RF signal. Such an RF signal may be introduced to the interaction region 718, for example, via conductor 720 and extracted via conductor 722. After fabrication, assembly 702 is cut (e.g., laser cut or water jet cut) to release individual components such as VED 700 leaving a gap 724.

Figure 8:
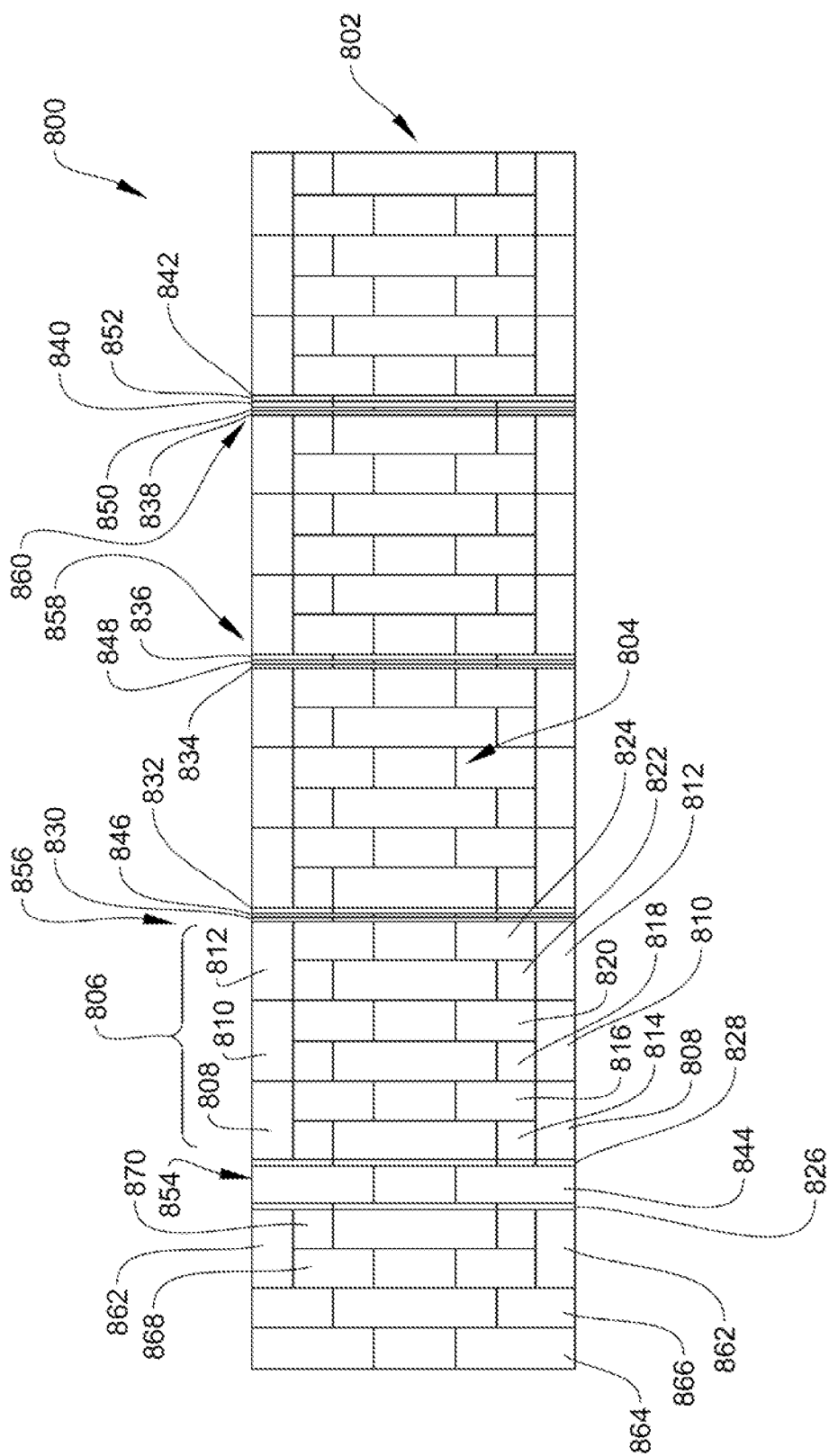
FIG. 8 is a cross-sectional view of a portion of the interior of the VED in accordance with an embodiment.

FIG. 8 is a cross-sectional view of a portion of the interior of the VED 800 in accordance with an embodiment. VED 800 may be formed of an assembly of bonded layers which may be horizontal to or orthogonal to the electron beam axis 802 of the device. The electron beam tunnel or interaction region is shown at 804. The VED 800 comprises a repeating set of blocks 806 which comprise elements 808, 810 and 812. Elements 808 and 812 are permanent magnets for helping to confine the electron beam(s) of VED 800. Element 810 may be a permanent magnet of a piece of a magnetic material such as iron or nickel. Elements 814, 816, 818, 820, 822 and 824 are electrically conductive elements through which the electron beam of VED 800 travels. Insulators 826, 828, 830, 832, 834, 836, 838, 840 and 842 isolate various control plates 844, 846, 848, 850 and 852 from the electrically conductive portions of the body of VED 800. Control plate 854, 856 and 858 may, for example, be used for focusing the electron beam by applying various electrical biases (DC voltage) to them. Control plate 860 comprises 3 insulators 838, 840 and 842 and two conductive plates 850, 852 and it may, for example, be used for applying two-axis electrostatic beam steering (one axis per plate) by applying various electrical biases (DC voltage) to plates 850, 852, e.g., one may be positive and one negative, for example. Elements 862 may be a permanent magnet of a piece of a magnetic material such as iron or nickel. Elements 864, 866, 868 and 870 are electrically conductive elements through which the electron beam of VED 800 travels.

If it is desired to "punch" or "pre-bunch" the electron beam for improved efficiency, the one-electrode electrostatic lenses could be provided with a pulsed or modulated voltage signal rather than a continuous DC voltage signal.

Figure 9:
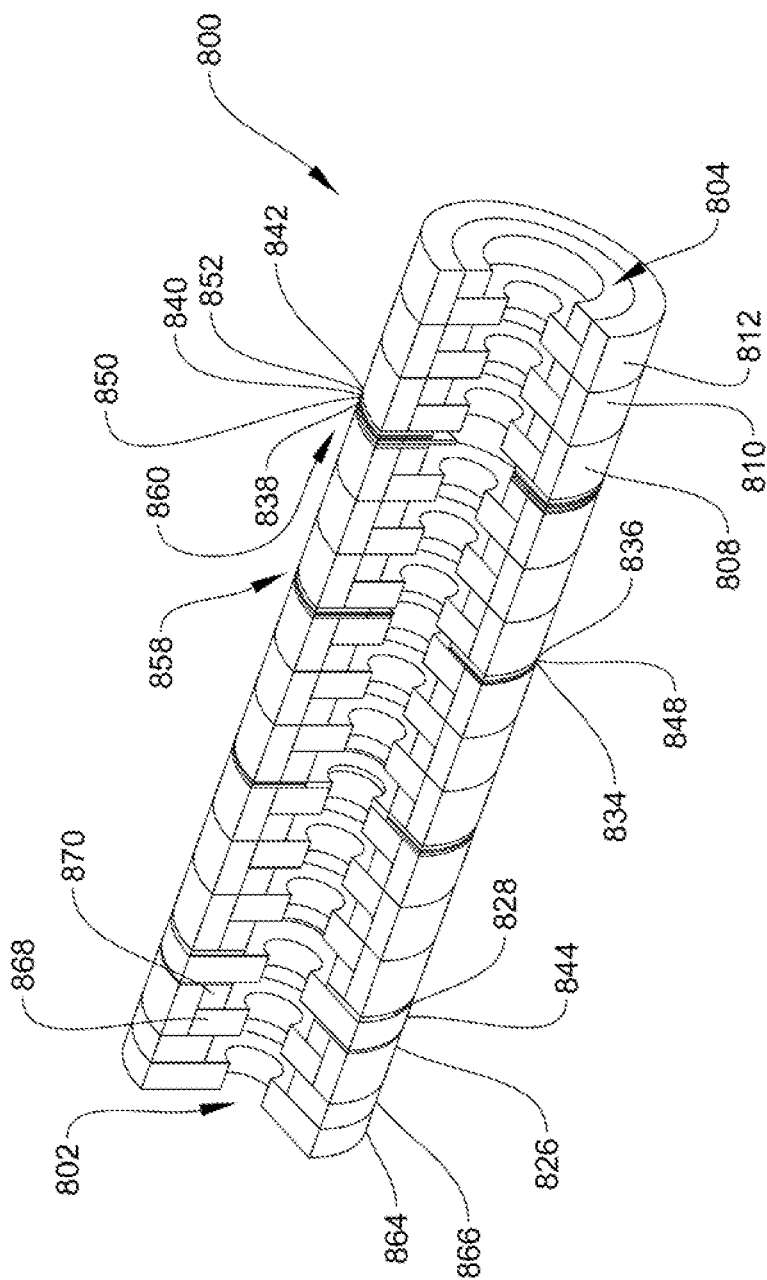
FIG. 9 is a partial cutaway front left side perspective view of the interior of the VED of FIG. 8 in accordance with an embodiment.

FIG. 9 is a partial cutaway front left side perspective view of the interior of the VED 800 of FIG. 8 in accordance with an embodiment.

Figure 10:
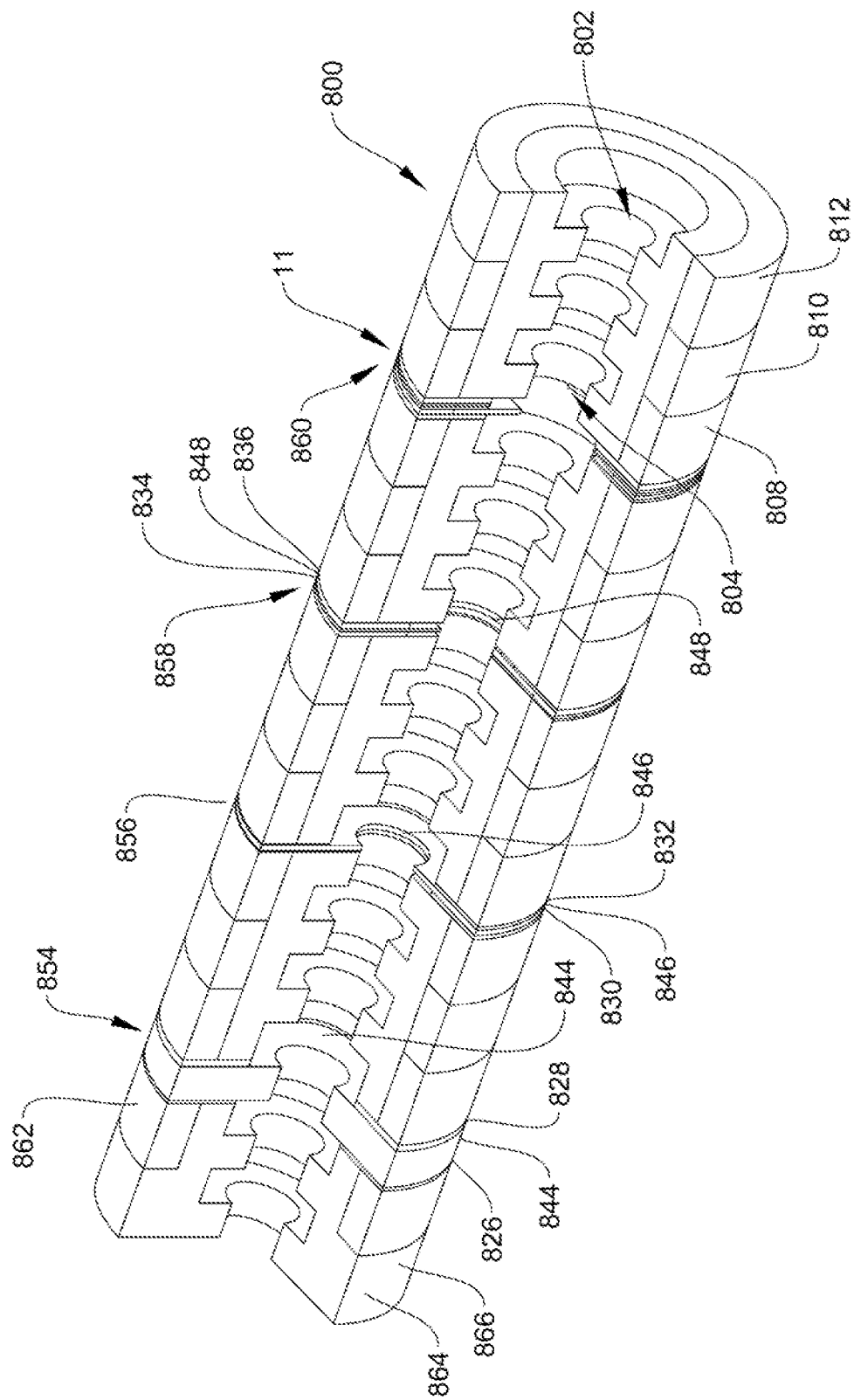
FIG. 10 is a partial cutaway front left side perspective view of the interior of the VED of in accordance with an embodiment.

FIG. 10 is a partial cutaway front left side perspective view of the interior of the VED 800 of FIG. 8 in accordance with an embodiment.

Figure 11:
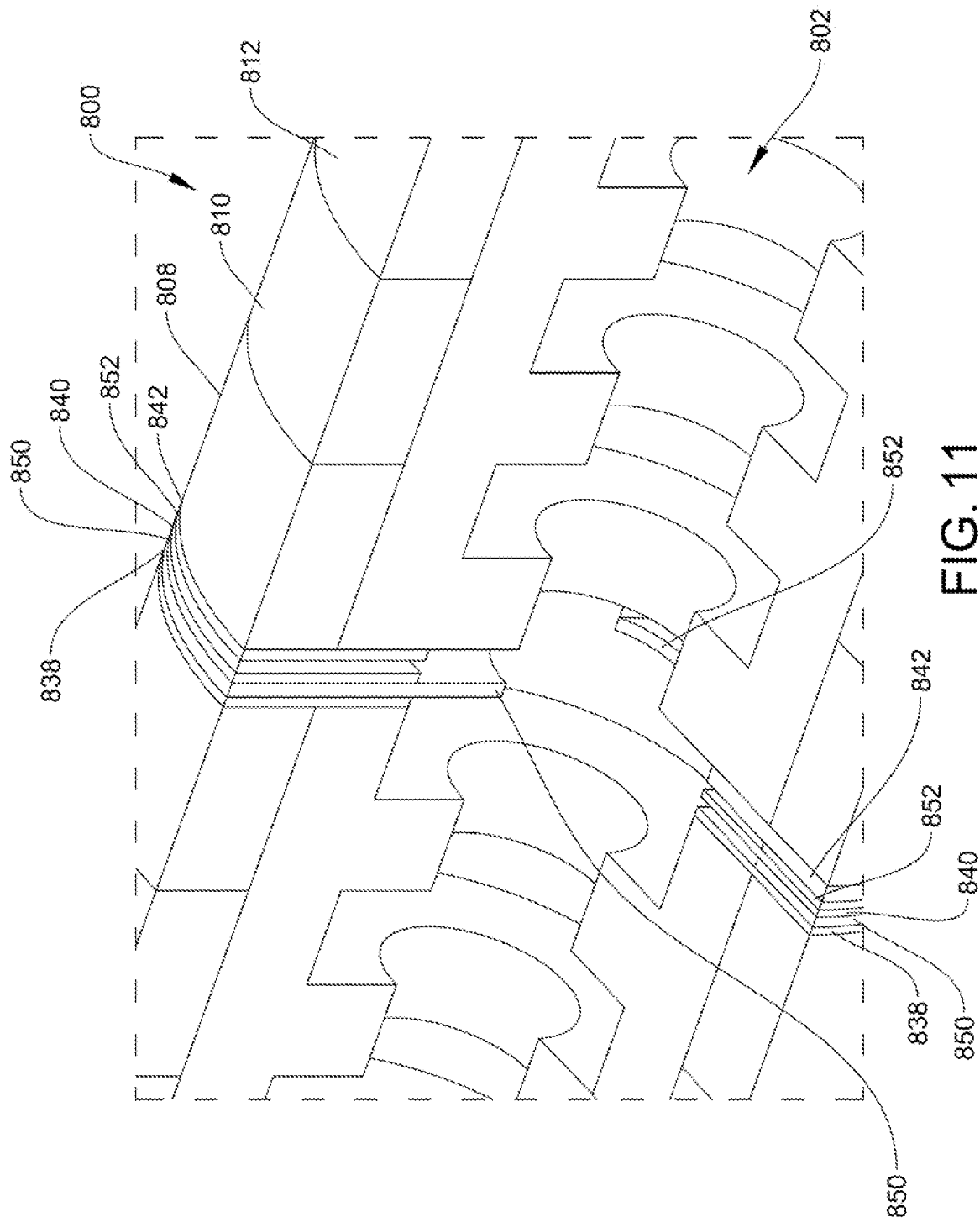
FIG. 11 is an exploded partial cutaway front left side perspective view of the interior of area 11 of the VED of FIG. 10 in accordance with an embodiment.

FIG. 11 is an exploded partial cutaway front left side perspective view of the interior of area 11 of the VED 800 of FIG. 10 in accordance with an embodiment.

Figure 12A:
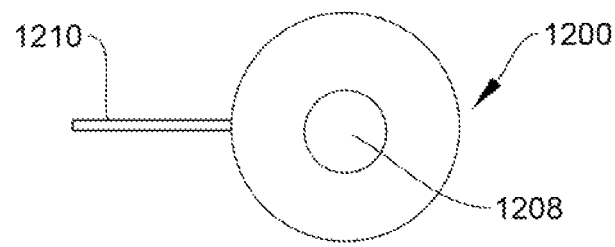
FIGS. 12A, 12B, 12C and 12D are diagrams illustrating various control plates which may be used in accordance with an embodiment to provide beam steering and focusing functions.

FIGS. 12A, 12B, 12C and 12D are diagrams illustrating various control plates or electrostatic lenses 1200, 1202, 1204 and 1206 which may be used in accordance with an embodiment to provide beam sensing (current), steering (deflection) and focusing (biasing) functions. Beam focusing can be achieved, for example, with a single voltage deployed in a completely conductive plate all around the electron beam. This is illustrated in FIG. 12A. The plate 1200 may be formed of a conductor such as copper or another vacuum-appropriate material. The electron beam goes through aperture 1208 in plate 1200 and a voltage (positive or negative) is applied to terminal 1210. The electrons, being negatively charged will be somewhat attracted to or repulsed by charged plate 1200 providing a focusing function.

Figure 12B:
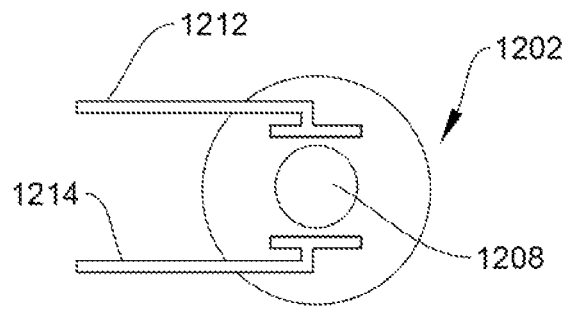

FIG. 12B illustrates a similar plate 1202 formed of an insulator such as alumina ($Al_2O_3$). Alumina is easily brazed as known to those of ordinary skill in the art. In the example shown in FIG. 12B, two electrodes 1212 and 1214 (located at 12 and 6 o'clock) are formed (as by plating or electrode-positing or another equivalent method). The electron beam may be steered or moved somewhat by applying a positive or negative voltage to one or both of electrodes 1212 and 1214. For example, one of electrodes 1212 and 1214 may be positively biased and the other may be negatively biased. Alternatively, one of electrodes 1212 and 1214 may be omitted altogether and the voltage applied simply to the remaining electrode.

Figure 12C:
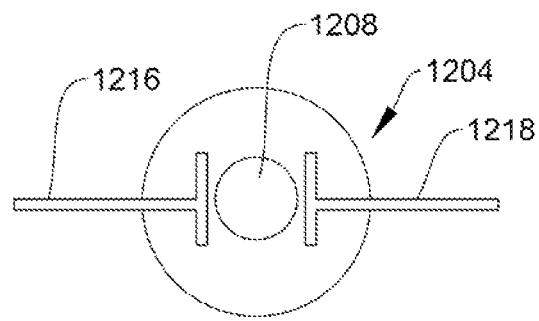

FIG. 12C illustrates a plate 1204 similar to plate 1202 of FIG. 12B, but oriented at a different angle (here 90 degrees off at 3 and 9 o'clock). If four electrode control is desired, plates 1202 and 1204 may be stacked near to, but insulated from, one another to provide such control with the addition of electrodes 1216 and 1218 of plate 1204.

Figure 12D:
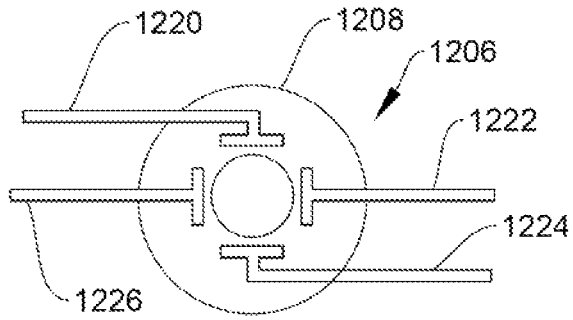

FIG. 12D illustrates the concept just described but implemented in a single plate having four electrodes 1220, 1222, 1224 and 1226. Note that, if desired, more electrodes my be provided and different angular positions may be used. A net voltage on the electrodes may provide focusing effects and an unbalanced voltage may provide electron beam deflection effects.

FIGS. 12A, 12B, 12C and 12D illustrate control plates which can be used for electron beam sensing, focusing and steering (as well as abeam acceleration/deceleration, if desired) in accordance with an embodiment. For example, in FIG. 8 they can be used for elements 854, 856, 858 and 860. The VEDs referred to herein are equipped with magnets to confine the electron beam to the beam tunnel region within the interaction region. The magnets may be of the solenoid type surrounding the VED or, as illustrated herein, they may be of the fixed type incorporated into the structure of the VED in order to place them closer (and more effectively) to the electron beam. Without some sort of confining force, the electron beam will spread like water coming from a hose. The magnetic confinement acts like a magnetic lens to confine the beam along its path so as to keep it narrow and out of direct impingement onto the structure of the VED where it would damage the VED and waste its energy.

The control plates are electrostatic lenses. Electrostatic lenses deployed periodically along the electron beam steer and focus the electron beam and are incorporated around the electron beam (they are hollow at their center to allow the beam to pass through) propagation path imposing an electric field along the fixed magnetic field. These control plates may have one or more electrical connections. They may be stacked close to one another. The electrostatic lenses may be integrated along the magnetic structure of the VED, interrupting it occasionally, allowing for the magnetic structure to get closer to the beam tunnel for achieving higher magnetic strength at the beam axis.

Furthermore, incorporating electrostatic lenses at various locations along the electron beam tunnel allows for incremental measurements of electron beam losses along the electron beam tunnel and/or circuit thus helping to identify problematic areas of the magnetic assembly or with the electron beam alignment. The electrostatic lenses may be oriented to run continuously along the electron beam tunnel in a certain axial location, they may be oriented to surround the electron beam, or they may be placed along the electron beam at certain discrete locations and at a fixed axial location.

The electrostatic lenses (individual conductors) may serve to sense electron current density at each sensor location along the electron beam. They may be used for electron beam focusing or steering by adjusting their potential to minimize electron beam current deposited on the electrodes and the VED structure. This technique is especially beneficial for VEDs operating in millimeter wave and near-THz frequencies to compensate for magnetic field irregularities commonly encountered is such devices.

The control plates can be adapted to provide a plurality of electrodes surrounding the electron beam to help characterize its position within the beam tunnel and its concentricity, if circular.

Magneto-electrostatic focusing design is enabled by the multi-layer multi-material manufacturing approach described herein. In accordance with that approach metallic, magnetic, and ceramic materials are employed in the manufacture of the focusing/steering/sensing system.

The approach may be used for beam types such as sheet beams, hollow beams, pencil beams, distributed beams, multi-beam devices, and the like.

The sensed electron beam current may be employed for optimizing the electron beam propagation along the electron beam tunnel by applying potential to the available electrostatic lenses to optimize electron beam propagation, thus reducing the need for technical expert assembly and trimming.

To completely focus and position the electron beam for maximum performance, the current from the beam going to ground but not to the collector can be monitored and minimized by the application of adjustments to the magnetic field about the VED and the electrostatic voltage inputs to the various control plates deployed along the electron beam.

Figure 13:
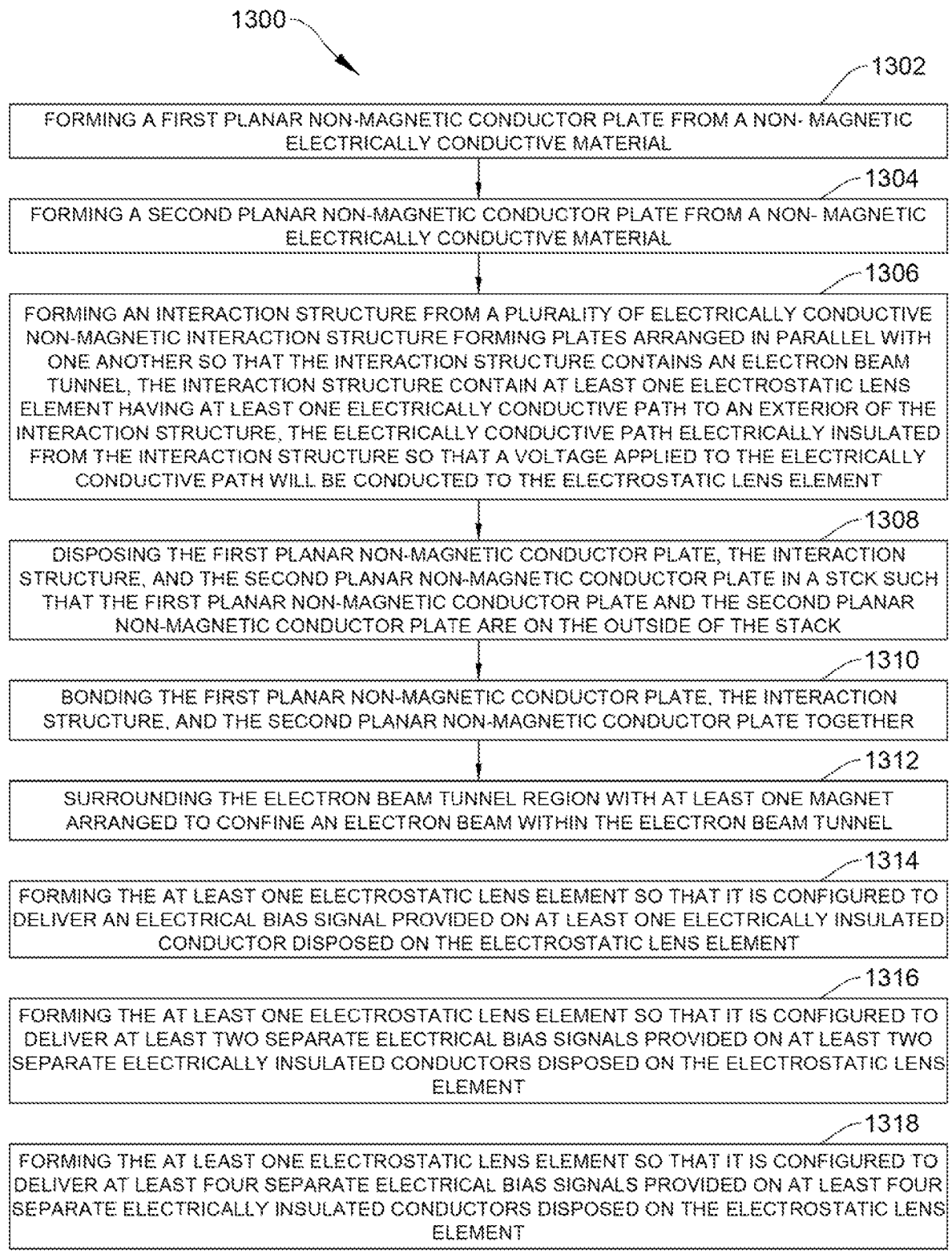
FIG. 13 is a flow chart illustrating a process or method for manufacturing a vacuum electron device in accordance with an embodiment of the invention.

FIG. 13 is a flow chart illustrating a process or method 1300 for manufacturing a vacuum electron device in accordance with an embodiment of the invention. The process steps described in connection with FIG. 13 may be carried out in sequence, or they may be carried out some or all at once.

At block 1302 is a first step: forming a first planar non-magnetic conductor plate from a non-magnetic electrically conductive material.

At block 1304 is a second step: forming a second planar non-magnetic conductor plate from a non-magnetic electrically conductive material.

At block 1306 is a third step: forming an interaction structure from a plurality of electrically conductive non-magnetic interaction structure forming plates arranged in parallel with one another so that the interaction structure contains an electron beam tunnel, the interaction structure contain at least one electrostatic lens element having at least one electrically conductive path to an exterior of the interaction structure, the electrically conductive path electrically insulated from the interaction structure so that a voltage applied to the electrically conductive path will be conducted to the electrostatic lens element.

At block 1308 is a fourth step: disposing the first planar non-magnetic conductor plate, the interaction structure, and the second planar non-magnetic conductor plate in a stack such that the first planar non-magnetic conductor plate and the second planar non-magnetic conductor plate are on the outside of the stack.

At block 1310 is a fifth step: bonding the first planar non-magnetic conductor plate, the interaction structure, and the second planar non-magnetic conductor plate together.

At block 1312 is a sixth step: surrounding the electron beam tunnel region with at least one magnet arranged to confine an electron beam within the electron beam tunnel.

At block 1314 is a seventh optional step: forming the at least one electrostatic lens element so that it is configured to deliver an electrical bias signal provided on at least one electrically insulated conductor disposed on the electrostatic lens element.

At block 1316 is a seventh optional step: forming the at least one electrostatic lens element so that it is configured to deliver at least two separate electrical bias signals provided on at least two separate electrically insulated conductors disposed on the electrostatic lens element.

At block 1318 is a seventh optional step: forming the at least one electrostatic lens element so that it is configured to deliver at least four separate electrical bias signals provided on at least four separate electrically insulated conductors disposed on the electrostatic lens element.

Those of ordinary skill in the art will now realize that these steps can be performed in an order most convenient for manufacture and need not be carried out in lock step. For example: the bonding steps could all be carried out at one time; the forming steps can be carried out in advance to fabricate parts for later assembly; and the like.

In bonding the two-dimensional sheets together, the following processes may be used: brazing, diffusion bonding, assisted diffusion bonding, solid state bonding, cold welding, ultrasonic welding, a combination of one or more of the foregoing, and the like. The joint formed between two adjacent sheets should maintain a vacuum environment of better than $1\times10^{-6}$ Torr. The bonding should be carried out in a non-reactive environment such as: hydrogen, nitrogen, vacuum and the like. Prior to bonding, the respective layers should be cleaned or plasma etched to remove the surface oxide layer and maintained in a vacuum environment prior to bonding in order to assist the formation of a good leak-tight bond. Where needed, the respective layers may be coated (sputtered, electroplated, metallized and/or painted) with vacuum-compatible materials that enhance the creation of a vacuum compatible interface between the two respective layers (which may be dissimilar materials). The coatings may include one or more of: nickel, gold, silver, molybdenum-manganese, copper, copper-gold, copper-silver, titanium-nickel, gold-copper-titanium, copper-silver-titanium, copper-silver-titanium-aluminum, titanium-nickel-copper, gold-copper-titanium-aluminum, silver-copper-indium-titanium, copper-germanium, palladium-nickel-copper-silver, gold-palladium-manganese, silver-palladium, gold-copper-nickel, gold-copper-indium, silver-copper-indium, gold-nickel, gold-nickel-chromium, and the like. In this manner the bonded layers form a high-strength assembly resulting in relatively high-power handling capability and high gradient capability VEDs.

The layers may be coated as well (sputtered, electroplated, metallized and/or painted) with electrically insulating or electrically conductive materials to manage voltage potentials in the VED as well as heat flow. Coatings may also include materials designed to conduct heat (e.g., diamond films, diamond conduction channels, cooling channels, heat pipes, and the like) in order to better manage heat flow within and away from the VED. Layers may be fabricated of insulators (e.g., $Al_2O_3$) which are then plated with conductive paths in order to form electrodes and electrical paths with which to bias the electrodes Cutouts or pockets may be formed in the electrically conductive sheets of the VED using techniques such as milling, turning, electric discharge milling, lithography, etching, laser cutting, electron beam cutting, waterjet cutting, and the like. Cutouts and pockets so formed may be populated by such components as ceramic materials, vacuum windows, circuit sever materials (attenuators used to improve device stability), electron emissive materials, vacuum pumping materials, getter materials, magnets, iron pieces, shielding materials, isolating materials, conductor wires, connectors, wave guides, couplers and the like.

The incorporation of ceramic materials enables the addition of electrostatic beam forming lenses or areas within the VED to aid in focusing, propagating, guiding, steering, punching and ultimately improving electron beam propagation between the cathode and the collector. By building this capability into the VED itself, rather than providing it outside of the vacuum region of the VED, finer and lower-power consuming control of the electron beam is made possible.

The alignment of adjacent layers or sheets of materials with in the VED during the manufacturing process may be accomplished using alignment features 112. Such features may be alignment holes, alignment pins, rectangular features, combinations thereof, optical (visible) marks suitable for robotic assembly techniques, as discussed elsewhere herein, and the like. The assembly of the sheets may be effected by manual assembly, robotic assembly, translational stages, automatic translation, robotic placement, micro to nanoscale video alignment, vernier scales, and the like.

While exemplary embodiments and applications have been shown and described, it would be apparent to those skilled in the art having the benefit of this disclosure that numerous modifications, variations and adaptations not specifically mentioned above may be made to the various exemplary embodiments described herein without departing from the scope of the invention which is defined by the appended claims.

What is claimed is:

1. A vacuum electron device for a radio-frequency (RF) amplifier or oscillator, comprising:
    a first non-magnetic conductor plate;
    a second non-magnetic conductor plate;
    a plurality of non-magnetic interaction structure forming plates disposed between the first non-magnetic conductor plate and the second non-magnetic conductor plate, the plurality of non-magnetic interaction structure forming plates together forming an RF interaction structure housing an electron beam tunnel region, the first non-magnetic conductor plate, the second non-magnetic conductor plate and the plurality of non-magnetic interaction structure forming plates being bonded together;
    permanent magnets arranged about the electron beam tunnel region to apply RF interaction to confine an electron beam within the electron beam tunnel region; and
    at least one control plate electrically insulated from the RF interaction structure, the at least one control plate coupled to at least one electrically insulated conductor arranged to pass through and be electrically insulated from the RF interaction structure, the at least one electrically insulated conductor configured to apply a corrective steering or focusing force on the electron beam within the electron beam tunnel region.

2. The vacuum electron device of claim 1, wherein the at least one control plate is configured to deliver an electrical bias signal provided on at least one electrically insulated conductor disposed on the control plate.

3. The vacuum electron device of claim 1, wherein the at least one control plate is configured to deliver at least two separate electrical bias signals provided on at least two separate electrically insulated conductors disposed on the control plate.

4. The vacuum electron device of claim 1, wherein the at least one control plate is configured to deliver at least four separate electrical bias signals provided on at least four separate electrically insulated conductors disposed on the control plate.

5. The vacuum electron device of claim 1, wherein the at least one electrically insulated conductor is further configured to sense electron current density.

6. A vacuum electron device (VED) for a radio-frequency (RF) amplifier or oscillator, comprising:
a plurality of electrically conductive sections of interaction structure housing an electron beam tunnel, the electron beam tunnel having a longitudinal axis parallel to the interaction structure, the electron beam tunnel being surrounded by at least one magnet arranged to apply RF interaction to confine an electron beam within the electron beam tunnel;
the plurality of electrically conductive sections being separated by a first pair of electrical insulators at a first position along the electron beam tunnel and by a second pair of electrical insulators at a second position along the electron beam tunnel, each of the first pair of electrical insulators and the second pair of electrical insulators sandwiching at least one electrostatic lens element disposed orthogonally to the longitudinal axis; and
each electrostatic lens element being provided with at least one electrically conductive path to an exterior of the interaction structure, the electrically conductive path being electrically insulated from the interaction structure so that a voltage applied to the electrically conductive path will be conducted to the electrostatic lens element to apply a corrective steering or focusing force on the electron beam within the electron beam tunnel.

7. The vacuum electron device of claim 6, wherein the at least one electrostatic lens element is configured to deliver an electrical bias signal provided on at least one electrically insulated conductor disposed on the electrostatic lens element.

8. The vacuum electron device of claim 6, wherein the at least one electrostatic lens element is configured to deliver at least two separate electrical bias signals provided on at least two separate electrically insulated conductors disposed on the electrostatic lens element.

9. The vacuum electron device of claim 6, wherein the at least one electrostatic lens element is configured to deliver at least four separate electrical bias signals provided on at least four separate electrically insulated conductors disposed on the electrostatic lens element.

10. The vacuum electron device of claim 6, wherein at least one electrically conductive path is configured to sense electron current density.

11. A method for fabricating a vacuum electron device for a radio-frequency (RF) amplifier or oscillator, the method comprising:
forming a first non-magnetic conductor plate from a non-magnetic electrically conductive material;
forming a second non-magnetic conductor plate from a non-magnetic electrically conductive material;
forming an interaction structure from a plurality of electrically conductive non-magnetic interaction structure forming plates arranged with one another so that the interaction structure contains an electron beam tunnel region, the interaction structure containing at least one electrostatic lens element having at least one electrically conductive path to an exterior of the interaction structure, the electrically conductive path electrically insulated from the interaction structure so that a voltage applied to the electrically conductive path will be conducted to the electrostatic lens element;
disposing the first non-magnetic conductor plate, the interaction structure, and the second non-magnetic conductor plate in a stack such that the first non-magnetic conductor plate and the second non-magnetic conductor plate are on the outside of the stack;
bonding the first non-magnetic conductor plate, the interaction structure, and the second non-magnetic conductor plate together; and
surrounding the electron beam tunnel region with at least one magnet arranged to confine an electron beam within the electron beam tunnel region.

12. The method of claim 11, further comprising:
forming the at least one electrostatic lens element so that it is configured to deliver an electrical bias signal provided on at least one electrically insulated conductor disposed on the electrostatic lens element, the at least one electrically insulated conductor configured to apply a corrective steering or focusing force on the electron beam within the electron beam tunnel region.

13. The method of claim 11, forming comprising:
forming the at least one electrostatic lens element so that it is configured to deliver at least two separate electrical bias signals provided on at least two separate electrically insulated conductors disposed on the electrostatic lens element, each electrically insulated conductor configured to apply a corrective steering or focusing force on the electron beam within the electron beam tunnel region.

14. The method of claim 11, further comprising:
forming the at least one electrostatic lens element so that it is configured to deliver at least four separate electrical bias signals provided on at least four separate electrically insulated conductors disposed on the electrostatic lens element, each electrically insulated conductor configured to apply a corrective steering or focusing force on the electron beam within the electron beam tunnel region.

* * * * *